United States Patent
Martin et al.

(10) Patent No.: US 7,180,445 B2
(45) Date of Patent: Feb. 20, 2007

(54) SATELLITE POSITIONING RECEIVER USING TWO SIGNAL CARRIERS

(75) Inventors: Nicolas Martin, Bourg les Valence (FR); Marc Revol, Upie (FR)

(73) Assignee: Thales, Neuilly/sur/Seine (FR)

( * ) Notice: Subject to any disclaimer, the term of this patent is extended or adjusted under 35 U.S.C. 154(b) by 205 days.

(21) Appl. No.: 10/515,394

(22) PCT Filed: Jun. 13, 2003

(86) PCT No.: PCT/FR03/01802

§ 371 (c)(1),
(2), (4) Date: Nov. 22, 2004

(87) PCT Pub. No.: WO03/107031

PCT Pub. Date: Dec. 24, 2003

(65) Prior Publication Data

US 2005/0175075 A1    Aug. 11, 2005

(30) Foreign Application Priority Data

Jun. 14, 2002  (FR) .................................. 02 07377

(51) Int. Cl.
    *G01S 5/00* (2006.01)
(52) U.S. Cl. .................. 342/357.12; 375/150
(58) Field of Classification Search .......... 342/357.12, 342/357.16, 89, 362; 340/825.58; 375/149, 375/150

See application file for complete search history.

(56) References Cited

U.S. PATENT DOCUMENTS

| 4,812,991 A | 3/1989 | Hatch |
| 5,359,332 A | 10/1994 | Allison et al. |
| 5,602,741 A | 2/1997 | Talbot et al. |
| 6,317,078 B1 | 11/2001 | Renard et al. |
| 6,588,117 B1 | 7/2003 | Martin et al. |
| 6,658,048 B1 * | 12/2003 | Valio .................. 375/150 |

OTHER PUBLICATIONS

Kaplan et al: "Understanding GPS Principles and Applications" Understanding GPS Principles and Applications, XX, XX, pp. 142-150 XP002165743.

* cited by examiner

*Primary Examiner*—Thomas H. Tarcza
*Assistant Examiner*—Nga X. Nguyen
(74) *Attorney, Agent, or Firm*—Lowe Hauptman & Berner, LLP (57) ABSTRACT

The invention relates to a satellite position pinpointing receiver intended to carry out combined processing of a first received radio signal and a second received radio signal which differ in frequency. The receiver comprises: a first correlator circuit and a second correlator circuit receiving the first and second received signals respectively, each correlator having a carrier correlation channel, a code correlation channel and a code correlation channel integrator. The receiver furthermore includes: a central-carrier phase discriminator; a device, the respective local carriers for the carrier correlation channels, a code phase discriminator; and a numerically controlled oscillator, for each correlation channel. Applications: satellite radio navigation by GPS, Galileo, Glonass, etc.

32 Claims, 7 Drawing Sheets

FIG.1

PRIOR ART

SATELLITE POSITIONING RECEIVER USING TWO SIGNAL CARRIERS

CROSS-REFERENCE TO RELATED APPLICATIONS

The present Application is based on International Application No. PCT/FR2003/001802, filed on Jun. 13, 2003, which in turn corresponds to FR 02/07377 filed on Jun. 14, 2002, and priority is hereby claimed under 35 USC §119 based on these applications. Each of these applications are hereby incorporated by reference in their entirety into the present application.

FIELD OF THE INVENTION

Satellite positioning systems employ, for pinpointing, several satellites that transmit their positions via radio signals and a receiver placed at the position to be pinpointed, estimating the distances, called pseudo-distances, that separate it from the satellites on the basis of the propagation times of the satellite signals picked up and performing the pinpointing operation by triangulation. The more precisely the satellite positions are known by the receiver and the more precise the measurements of the pseudo-distances made by the receiver are, the more precise is the pinpointing.

BACKGROUND OF THE INVENTION

The positions of the satellites are determined on the basis of a network of ground tracking stations independent of the positioning receivers. These positions are communicated to the positioning receivers via the satellites themselves, by data transmission. The pseudo-distances are deduced by the positioning receivers from the apparent delays exhibited by the received signals relative to the clocks of the satellites, which are all synchronous.

Although the precision in knowing the positions of the satellites of the positioning system is independent of the performance of a positioning receiver, this is not the case for the precision of the pseudo-distance measurements, which depends on the precision of the measurement of the signal propagation times at the receiver.

Radio signals transmitted by satellites travel large distances and, since they are transmitted at limited power levels, reach the receivers with very low power levels that are buried in radio noise. To make it easier to receive them, it has been attempted to make them the least sensitive possible to narrow-band interference, by increasing their bandwidths by means of the band spreading technique. The current systems, and those intended in the near future, for satellite positioning used, for the radio signals transmitted by their satellites, the technique of band spreading by modulation with the aid of pseudorandom binary sequences, a technique known as DSSS (Direct Sequence Spread Spectrum). This DSSS modulation consists, after having arranged the information to be transmitted in the form of a sequence of binary elements with a regular datarate, in multiplying each binary information element by a pseudorandom binary sequence of markedly faster datarate. The band spreading obtained is proportional to the ratio of the datarate of the sequence of binary data elements to the datarate of the pseudorandom binary spreading sequence.

The information to be transmitted from the satellites, once placed in the form of a frequency-spread sequence of binary data items by DSSS modulation, are transposed in the transmission frequency range by modulation with a transmission carrier. To make it easier to measure the signal propagation times at a positioning receiver and to avoid the presence of isolated lines in the spectra of the signals transmitted by the satellites, each pseudorandom binary sequence used for frequency spreading consists of binary elements of the same duration, taken to be equal to integer multiples of the periods of the transmission carriers, whereas the various datarates and frequencies used within the satellites are synchronized and derive from a very precise common clock.

Upon reception, the binary information contained in a radio signal from a satellite of a positioning system is extracted by two demodulations often carried out in an interlinked manner, a first demodulation using a carrier generated locally by an oscillator controlled by a PLL (Phase Locked Loop) for transposing the signal received in broadband and a second demodulation using pseudorandom binary sequences generated locally by a pseudorandom binary sequence generator controlled by a DLL (Delay Locked Loop) for despreading the sequence of binary information items present in the received signal.

The propagation times of the received signals are manifested, at reception, by delays that affect the pseudorandom binary sequences present in the received signals and the carrier modulating the received signal.

The delays affecting the pseudorandom binary sequences are accessible, modulo the duration of one of their binary digits, from the control signals of the DLLs. The delays observed by these loops allow unambiguous measurements, or those of low ambiguity, of the propagation times of the pseudorandom binary sequences since the number of complete pseudorandom sequences passing over the signal paths is relatively small. This is referred to as code measurements.

For example, in the case of the GPS satellite positioning system, the shortest pseudorandom binary sequence, that used for satellite signal spreading of the C/A (Coarse/Acquisition Code or Clear/Acquisition Code) type, is composed of 1023 binary digits with a rate of 1023 MHz and a duration of one millisecond. Its total duration corresponds to a path of 300 km for a radio wave and allows measurements of distance modulo 300 km. The 1 microsecond duration of each of its binary digits permits a precision of the order of 0.1 microseconds in the measurement of its delay at reception, corresponding to a 30 meter path in the case of a radio wave. The ambiguity in the pseudo-distance measurements obtained from the pseudorandom binary sequence of a C/A code, due to the fact that measurements modulo 300 km are to be made, is easy to resolve as soon as the receiver receives from more than four satellites, as it is then possible to take various points on the same position from different sets from four satellites and to retain only the common solution. In the absence of such a possibility, the ambiguity may also be resolved using very coarse prior knowledge of the position. Such a measurement ambiguity does not arise with P-type satellite signals of the GPS system, which use, for spreading them, a pseudorandom binary sequence of 266.41 days duration, but these signals are not freely available to users.

The apparent delays of the transmission carriers are accessible, modulo the periods of these carriers, by the phase shifts displayed by the PLLs that control the local carrier generators. This is referred to as phase measurements. These measurements are very precise, but highly ambiguous. In the case of the GPS system, the satellite transmission signals lie within the 1.3 GHz and 1.5 GHz frequency bands and allow pseudo-distance measurement modulo 0.2 m, therefore highly ambiguous measurements, since the distance to the satellites is of the order of 20 000 km, precise to about 0.02 m.

It is conceivable to use, concurrently, the phase measurements and the code measurements on one and the same received signal coming from a positioning satellite and to apply a Vernier technique in order to improve the precision of the unambiguous code measurement by means of the very precise but highly ambiguous phase measurement. However, the very large difference between the measurement scales, namely the wavelength of the pseudorandom binary sequence of the spreading code and the wavelength of the transmission carrier, does not allow the precision of a phase measurement to be retained while resolving the ambiguity sufficiently to have easily useable pseudo-distance measurements.

It is usual for a satellite of a positioning system to transmit over at least two frequency ranges so as to allow a receiver to estimate the effect of the ionosphere on the ionospheric propagation speed and to take account of this in its pseudo-distance measurements. Thus, a GPS satellite transmits over two frequency ranges centered on 1575.42 and 1227.60 GHz. Within the 1575.42 GHz range, it provides two navigation services consisting of the transmission of the same ephemeris data over two independent channels spread in one of the channels by a C/A code and in the other by a P(Y) code. In the 1227.60 GHz range, it provides a single service, which may consist of the transmission of data spread by a C/A code or a P(Y) code, or of a single P(Y) code.

Currently, the envisaged satellite positioning systems are designed to offer several services corresponding to different levels of performance and of integrity in the pinpointing matched to the more demanding or less demanding requirements of different categories of users. This is the case with the new Galileo satellite position system that offers several services, all dual frequency (E1 & E5, E2 & E6, etc.), so as to allow ionosphere correction then to improve robustness in the case of jamming of one of the bands, some services being free-access services and others controlled-access services.

In the case of dual-frequency services, the signals are tracked independently over each band by PLL and DLL tracking loops. The pseudo-distance measurements, which rely on the delays observed by the PLL tracking loops, are limited in terms of precision by the width of each available band. Because of the independence of the tracking loops, any combined use of measurements obtained from signals of different bandwidths will result in a precision limited by the lesser of the two tracking loops.

What is sought in real time is an absolute measure of the distance between the satellite and the receiver that has a precision given by the frequency difference between the bands (a wavelength fraction of the difference). To do this, it is sought to define a method of improving the measurement precision that is more robust than the known phase Vernier method, which is as independent as possible of ionosphere effects, and making it possible, despite everything, to benefit from the frequency spacing between two limited-band signals, for example the signals E1 and E2.

SUMMARY OF THE INVENTION

The object of the present invention is to improve the precision of pseudo-distance measurements within the context of a dual-frequency service, with synchronous navigation signals, of a satellite positioning system by combining the received signals on the two frequencies in order to benefit from a larger equivalent frequency bandwidth.

Figure 1:
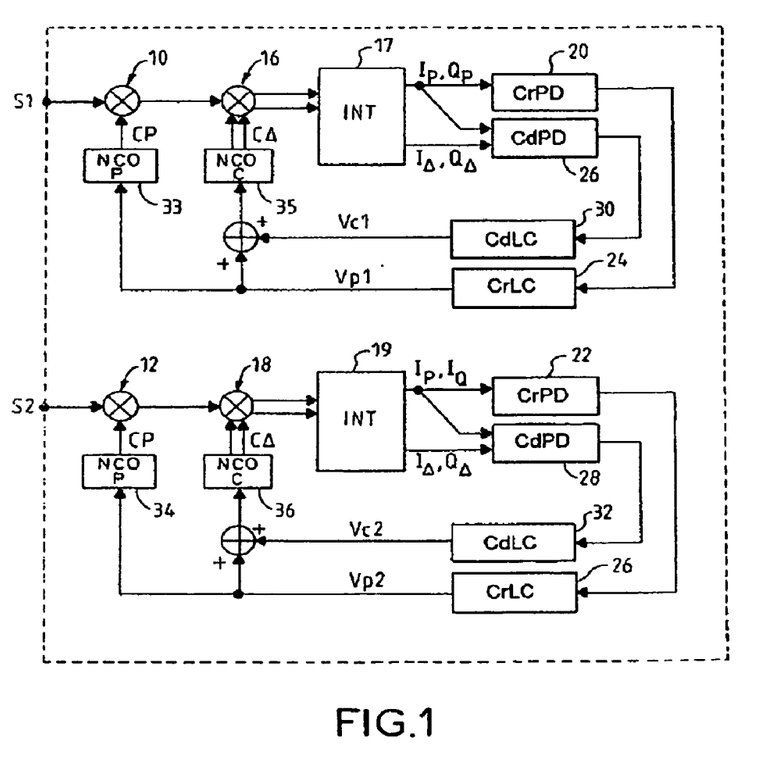
FIG. 1, already described, shows a receiver of the prior art, which includes a phase loop and a code loop for each signal received.

FIG. 1 shows a receiver of the prior art that receives two signals S1 and S2 at the respective frequencies $F_{E1}$ and $F_{E2}$. These two signals are processed independently by a carrier loop 10, 12 and a code loop 16, 18.

Each of the code correlation loops 16, 18, after integration at 17, 19, delivers respectively, on the basis of the respective received signals S1 and S2, on the one hand, signals $I_P$ and $Q_P$ to a carrier discriminator 20, 22 that generates, via a carrier loop corrector 24, 26, the respective carrier speed Vp1, Vp2 and, on the other hand, the signals $I_P$ and $Q_P$ and $I_\Delta$, $Q_\Delta$ to a code phase discriminator 26, 28 that generates, via a code loop corrector 30, 32, the respective code speed Vc1 and Vc2.

A numerically controlled oscillator (NCO p) 33, 34 generates, on the basis of the carrier speed Vp1, Vp2, the local carriers of the carrier correlation channel 10, 12.

A numerically controlled oscillator (NCO c) 35, 36 generates, on the basis of the code speed Vc1, Vc2, the local carriers of the code correlation channel and the local codes.

Each carrier loop 10, 12 uses the correlation by a point code cp, synchronous with the received code.

Each code loop uses the correlation by a delta code cΔ (or advance minus delay), synchronous with the point code.

For each of the loops, the carrier phase discriminator delivers the error information such that:

$$\delta\varphi = \arctan\left(\frac{Q_P}{I_P}\right)$$

and the code phase discriminator delivers an error such that:

$$\delta\varepsilon = \arctan\left(\frac{(I_\Delta I_P - Q_\Delta Q_P)}{I_P^2 + Q_P^2}\right).$$

The two pseudo-distances resulting from the processing of the signals (output by the code NCOs) may be optimally combined before being used in the resolution of the navigation point.

The novel idea forming the subject matter of the invention consists in processing the two signals no longer independently but by tracking, on the one hand, a central carrier between the carriers for the two signals by a carrier loop and tracking, on the other hand, a subcarrier, which is the image of the differences between each carrier and the central carrier, by a second loop, replacing the code loop and also serving to control the position of the local code for the despreading.

Figure 2:
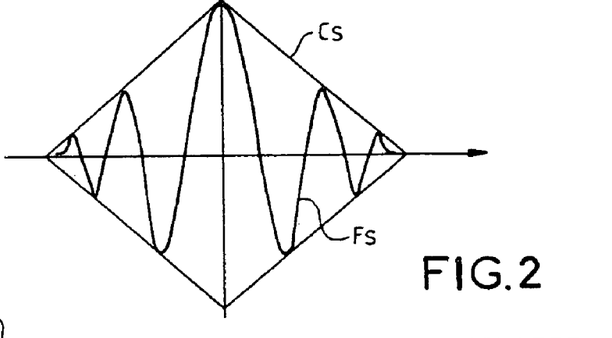
FIG. 2, already described, shows the code correlation function resulting from the processing, according to the invention, of the received signals.

The code correlation function resulting from the processing, according to the invention, of the received signals, which is shown in FIG. 2, is thus the envelope of the code correlation function alone Cs multiplied by a sinusoidal frequency function Fs equal to the frequency difference between the centers of the bands of the received signals.

This correlation function therefore has a single maximum, narrower than that of a single code, making it possible to achieve, through the code loop, a level of precision intermediate between that of a single code and of a direct phase measurement on the carrier, with in addition the advantage of extracting the measurements with a twofold increase in signal-to-noise ratio.

The immediate advantage is therefore being able to control a single code loop (DDL) giving much more precise raw pseudo-distance measurements. The increase in precision thus obtained allows the precision in the estimate of the position to be significantly increased, when the other sources of degradation can be eliminated or estimated. This is the case for differential positioning applications in which for example the ionosphere propagation errors can be eliminated, in the case of Cat II and Cat III precision.

Similarly, it is necessary to track only a single carrier, locked onto the intermediate frequency $(F_{E2}-F_{E1})/2$. More precise phase (carrier) measurements are also extracted thanks to a twofold increase in signal-to-noise ratio.

For this purpose, the invention proposes a satellite position pinpointing receiver intended to carry out combined processing of a first radio signal and a second radio signal that are received at separate frequencies, characterized in that it comprises:

a first correlator circuit and a second correlator circuit receiving the first and second received signals respectively, each correlator having a correlation channel for in-phase and quadrature correlation between the respective received signal and a respective local carrier, a code correlation channel for correlation between the I- and Q-correlated received signal and a respective local code, and a code correlation channel integrator, the receiver furthermore comprising:

a central-carrier phase discriminator for discriminating between the two carriers of the received signals, the phase discriminator delivering, on the basis of the signals Ip1, Qp1 and Ip2, Qp2 output by the two integrators and after a phase loop correction, a central-carrier speed signal;

a device that delivers, on the basis of the central-carrier speed and of a subcarrier speed (or code speed), the respective local carriers for the carrier correlation channels, this subcarrier being the image of the differences between each received-signal carrier and the central carrier;

a code phase discriminator that delivers, on the basis of the signals Ip1, Qp1 and Ip2, Qp2 output by the integrators and after a code loop correction, the subcarrier speed (or code speed) signal for the carrier correlation and code correlation channels; and a numerically controlled oscillator for each code correlation channel, the oscillator delivering, on the basis of the subcarrier speed (or code speed), the respective local code for each code channel.

In the invention, a single carrier loop and a single code loop are constructed for processing the two received signals S1, S2.

The carrier loop slaves the phase of the central carrier for the local signals to the phase of the central carrier for the received signals. The code loop (or subcarrier loop) slaves the phase of the local subcarrier, which is the image of the phase difference between the carriers for the two local signals, to the phase of the received subcarrier, which is the image of the phase difference between the two received signals, and the position of the local codes to the received codes.

The correlation with the delta channel of the receivers of the prior art is no longer carried out, since the code is controlled solely by means of the loop on the basis of the difference between the two carriers. This phase difference undergoes the same dynamics as the code delay, apart from the dynamics of the carrier, which sees an ionosphere error opposite to the code error.

BRIEF DESCRIPTION OF DRAWINGS

The invention will be more clearly understood with the aid of embodiments of the receiver according to the invention, with reference to the appended drawings in which.

DETAILED DESCRIPTION OF PREFERRED EMBODIMENT

Figure 3:
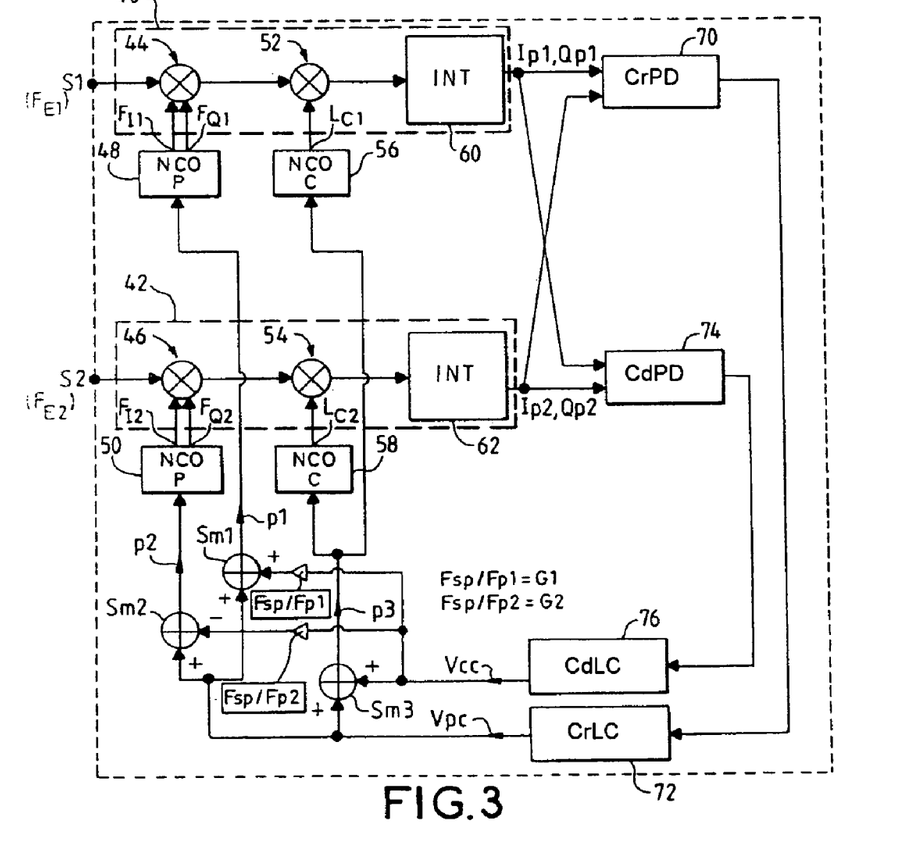
FIG. 3 shows a receiver according to the invention, which includes a single code loop and a single phase loop for the received signals.

FIG. 3 shows a block diagram of a receiver according to the invention. In this embodiment shown in FIG. 3 the subcarrier loop or code loop is assisted by the central carrier loop.

The receiver shown in FIG. 3 includes a first correlator circuit 40 into which a first received signal S1 at a frequency $F_{E1}$ is delivered and a second correlator circuit 42 into which the second received signal S2 at a frequency $F_{E2}$ is delivered.

Each correlator circuit comprises a correlation channel 44, 46 for in-phase and quadrature correlation between its respective received signal S1, S2 and two respective local carriers $F_{I1}$, $F_{Q1}$ in the case of the first correlation channel 44 and $F_{I2}$, $F_{Q2}$ in the case of the second correlation channel 46, these local quadrature carriers being generated by a respective carrier numerically controlled oscillator 48, 50.

The signals $I_1$, $Q_1$ and $I_2$, $Q_2$ output by the carrier phase correlation channels are then correlated in a respective code correlation channel 52, 54 with the local code delivered by a respective local code number generator 56, 58.

Next, the code correlations are integrated by a respective code integrator 60, 62 in order to deliver signals Ip1, Qp1 output by the first correlator 40 and Ip2, Qp2 output by the second correlator 42.

A carrier phase discriminator 70 delivers, on the basis of the signals Ip1, Qp1 and Ip2, Qp2 output by the integrators 60, 62 after passing through a central-carrier loop corrector 72, a central-carrier speed signal Vpc between the two carriers for the received signals S2 and S2 in order to control the respective signal-carrier numerically controlled oscillators 48, 50.

A code phase discriminator 74 delivers, on the basis of the signals Ip1, Qp1 and Ip2, Qp2 output by the integrators 60, 62 and after passing through a code loop corrector 76, a subcarrier speed signal Vcc between the two received signals S1 and S2 in order to control the respective code numerically controlled oscillators 56, 58.

The carrier speed Vpc and code speed Vcc are linear speeds, expressed for example in meters/second.

To generate the local carriers of the carrier correlation channels, $F_{I1}$, $F_{Q1}$ in the case of the first correlation channel 44 and $F_{I2}$, $F_{Q2}$ in the case of the second correlation channel 42, it is necessary to take account of the central carrier between the signals and the subcarrier, this subcarrier being the image of the differences between each received signal carrier and the central carrier.

The carrier numerically controlled oscillators (NCO p) 48 and 50 deliver, on the basis of the carrier speed signal Vpc and subcarrier speeds or code speed Vcc, output by the central-carrier loop corrector 72 and the code loop corrector 76 respectively, the two respective local carriers $F_{I1}$, $F_{Q1}$ in the case of the first correlation channel 44 and $F_{I2}$, $F_{Q2}$ in the case of the second correlation channel 46. For this purpose, on the one hand, the numerically controlled oscillator 48 of the carrier correlation channel 44 of the first correlator circuit is controlled by a signal p1 output by a summer Sm1, the summer Sm1 taking the sum of the carrier speed signal Vpc plus the code speed signal Vcc.G1, where G1 is a gain given by the ratio of the subcarrier frequency $F_{SP}$ to the carrier frequency $F_{P1}$ of the first signal, ($G1=F_{SP}/F_{P1}$) and, on the other hand, the numerically controlled oscillator 50 of the carrier correlation channel 46 of the second correlator circuit is controlled by a signal p2 output by a summer Sm2, the summer Sm2 taking the sum of the carrier speed signal Vpc plus the code speed signal Vcc.(-G2), where G2 is a gain given by the ratio of the subcarrier frequency $F_{SP}$ to the carrier frequency $F_{P2}$ of the second signal, ($G2=F_{SP}/F_{P2}$).

It should be noted that the subcarrier frequency $F_{SP}$ is:

$$F_{SP}=(F_{P1}-F_{P2})/2$$

and the central carrier frequency $F_{pc}$ is:

$$F_{pc}=(F_{P1}+F_{P2})/2$$

where $F_{P1}$ is the frequency of carrier 1 and $F_{P2}$ is the frequency of carrier 2.

The code numerically controlled oscillators (NCO c) 56 and 58 deliver, on the basis of the subcarrier speed signal Vcc, output by the code loop corrector 76, the respective local code (Lc1, Lc2) for each code correlation channel. In the case of the embodiment shown in FIG. 3, the code loop is assisted by the carrier loop. For this purpose, the numerically controlled oscillators 56, 58 of the code correlation channels 52, 54 are controlled by a signal p3 output by a summer Sm3 resulting from the sum of the carrier speed signal Vpc plus the code speed signal Vcc.

The carrier phase discriminator delivers a phase error $\delta\phi$ such that:

$$\delta\varphi = \arctan\left(\frac{\text{Im}(Z_{P1}+Z_{P2})}{\text{Re}(Z_{P1}+Z_{P2})}\right) = \arctan\left(\frac{Q_{P1}+Q_{P2}}{I_{P1}+I_{P2}}\right)$$

$Z_{P1}$ and $Z_{P2}$ representing the cumulative signals after correlation by the local signals.

The code phase discriminator delivers a phase error $\delta\epsilon$ such that:

$$\delta\varepsilon = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1}-I_{P1}Q_{P2}}{I_{P1}I_{P2}+Q_{P1}Q_{P2}}\right).$$

Case with Data (Data Channels):

In this case, the integration of the samples ($I_P$, $Q_P$) is carried out over the duration of the data bits.

Carrier Phase Discriminator:

$$\delta\varphi = \arctan\left(\frac{\text{Im}(\varepsilon_1 Z_{P1}+\varepsilon_2 Z_{P2})}{\text{Re}(\varepsilon_1 Z_{P1}+\varepsilon_2 Z_{P2})}\right) = \arctan\left(\frac{\varepsilon_1 Q_{P1}+\varepsilon_2 Q_{P2}}{\varepsilon_1 I_{P1}+\varepsilon_2 I_{P2}}\right)$$

where $\epsilon_1 = \text{sign}(I_{p1})$ $\epsilon_2 = \text{sign}(I_{p2})$.

Code Phase Discriminator:

$$\delta\varepsilon = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1}-I_{P1}Q_{P2}}{I_{P1}I_{P2}+Q_{P1}Q_{P2}}\right).$$

Figure 4:
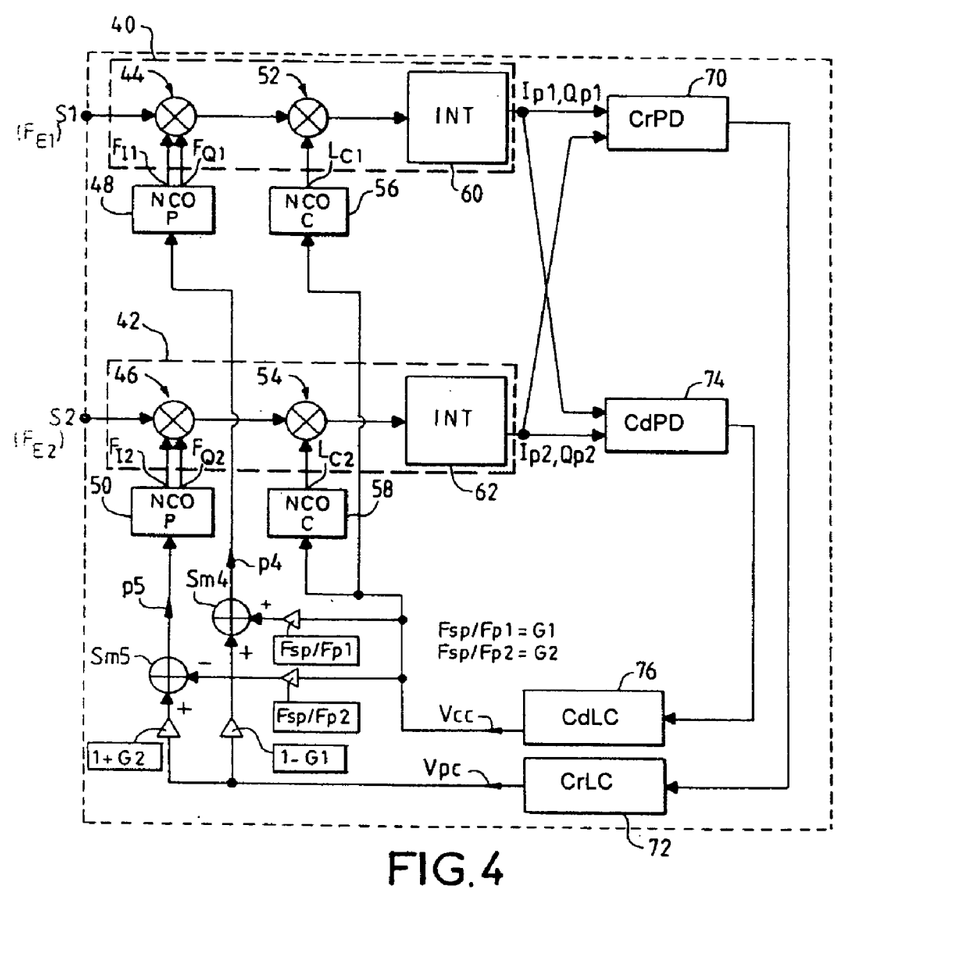
FIG. 4 shows a variant of the receiver of FIG. 3 according to the invention.

FIG. 4 shows a variant of the receiver of FIG. 3 according to the invention. In this variant shown in FIG. 4, the code loop is not assisted by the carrier loop.

The receiver of FIG. 4 comprises the first correlator circuit 40 into which the first received signal S1 at the frequency $F_{E1}$ is delivered and the second correlator circuit 42 into which the second received signal S2 at the frequency $F_{E2}$ is delivered.

The carrier numerically controlled oscillators (NCO p) 48 and 50 deliver, on the basis of the carrier speed signal Vpc and of the code speeds Vcc, output respectively by the central-carrier loop corrector 72 and the code loop corrector 76, the two respective local carriers $F_{I1}$, $F_{Q1}$ in the case of the first correlation channel 44 and $F_{I2}$, $F_{Q2}$ in the case of the second correlation channel 46. For this purpose, on the one hand, the numerically controlled oscillator 48 of the carrier correlation channel 44 of the first correlator circuit is controlled by a signal p4 output by a summer Sm4, the summer Sm4 taking the sum of the carrier speed signal Vpc. (1-G1) plus the code speed signal Vcc.G1 and, on the other hand, the numerically controlled oscillator 50 of the carrier correlation channel 46 of the second correlator circuit is controlled by a signal p5 output by a summer Sm5, the summer Sm5 taking the sum of the carrier speed signal Vpc. (1+G2) plus the code speed signal Vcc. (-G2).

It should be noted that the subcarrier frequency $F_{SP}$ is:

$$F_{SP}=(F_{P1}-F_{P2})$$

and the central carrier frequency $F_{pc}$ is:

$$F_{pc}=(F_{P1}+F_{P2})/2$$

where $F_{P1}$ is the frequency of carrier 1 and $F_{P2}$ is the frequency of carrier 2.

The code numerically controlled oscillators (NCO c) 56 and 58 deliver, on the basis of the subcarrier speed signal Vcc output by the code loop corrector 76, the respective local code (Lc1, Lc2) for each code channel and the local despreading codes.

Figure 5:
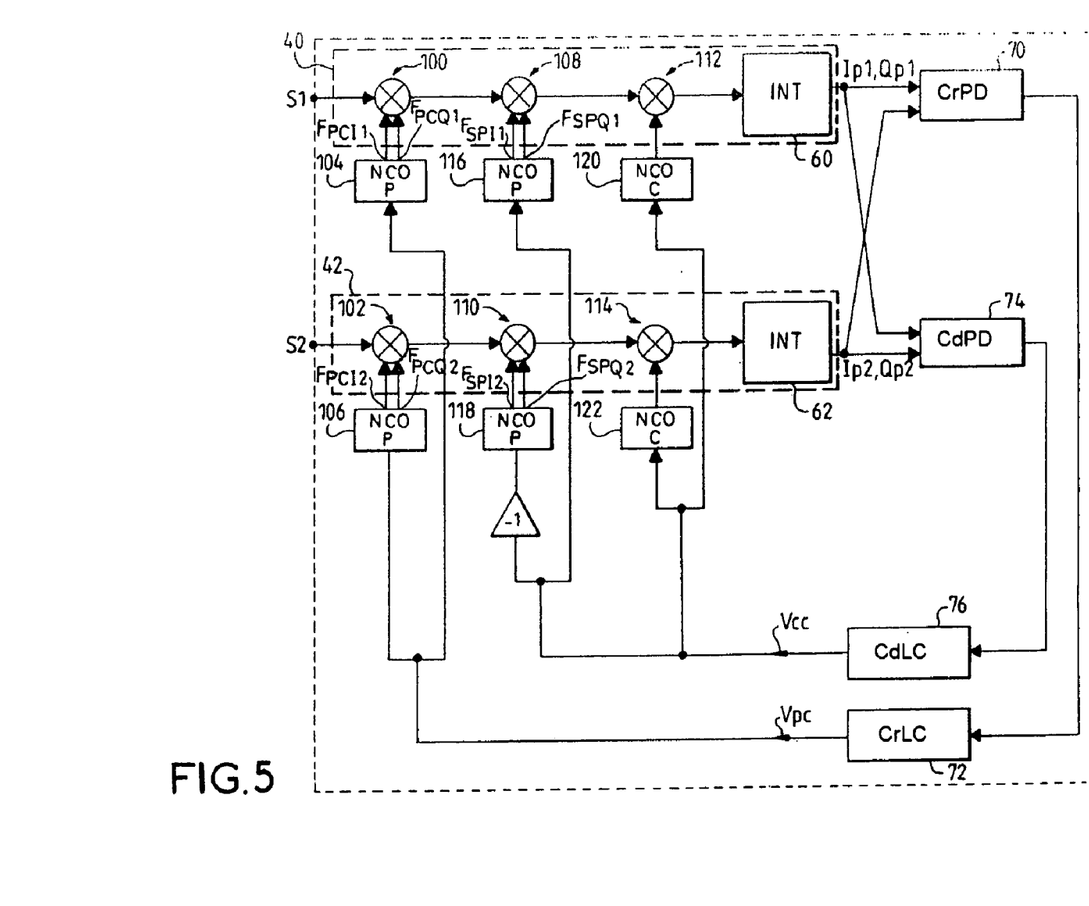
FIG. 5 shows another embodiment of the receiver according to the invention, which includes three numerically controlled oscillators.

FIG. 5 shows a first alternative embodiment of the receiver according to the invention, having a device that comprises three numerically controlled oscillators per channel for the signals S1 and S2. In this first three-oscillator embodiment, the code correlation channels are not assisted by the carrier speed Vpc.

The receiver shown in FIG. 5 comprises the first correlator circuit 40 into which a first received signal S1 at the frequency $F_{E1}$ is delivered and the second correlator circuit 42 into which the second received signal S2 at the frequency $F_{E2}$ is delivered.

Each correlator circuit 40, 42 comprises a correlation channel 100, 102 for in-phase and quadrature correlation between its respective received signal S1, S2 and two respective local carriers at the central frequency, $F_{PCI1}$, $F_{PCQ1}$ in the case of the first correlation channel 100 and $F_{PCI2}$, $F_{PCQ2}$ in the case of the second channel 102, these local quadrature carriers being generated by a respective central-carrier numerically controlled oscillator 104, 106 controlled by a central-carrier speed signal Vpc output by the carrier loop corrector 72.

The outputs of the central carrier correlation channels are delivered to the subcarrier correlation channels 108, 110 and then to the code correlation channels 112, 114. The subcarrier correlation channels 108, 110 carry out the complex correlation between the outputs of the in-phase and quadrature central-carrier correlation channels and of the respective in-phase and quadrature local carriers $F_{SPI1}$, $F_{SPQ1}$ in the case of the first correlation channel and $F_{SPI2}$, $F_{SPQ2}$ in the case of the second correlation channel. The respective local subcarriers $F_{SPI1}$, $F_{SPQ1}$, $F_{SPI2}$, $F_{SPQ2}$ are generated, the first ones by a first subcarrier numerically controlled oscillator 116 controlled by the code speed signal Vcc output by the code loop corrector 76 and the second one by a second subcarrier numerically controlled oscillator 118 controlled by the code speed signal Vcc multiplied by −1, output by the code loop corrector 76.

The signals output by the subcarrier correlation channels are then correlated in the respective code correlation channels 112, 114 with the local code delivered by a respective local code number generator 120, 122 controlled by the code speed signal Vcc.

As in the receiver shown in FIG. 3, the code correlations are then integrated by the respective code integrator 60, 62 in order to deliver signals $I_{P1}$, $Q_{P1}$ as output from the first correlator 40 and $I_{P2}$, $Q_{P2}$ as output from the second correlator 42.

Figure 6:
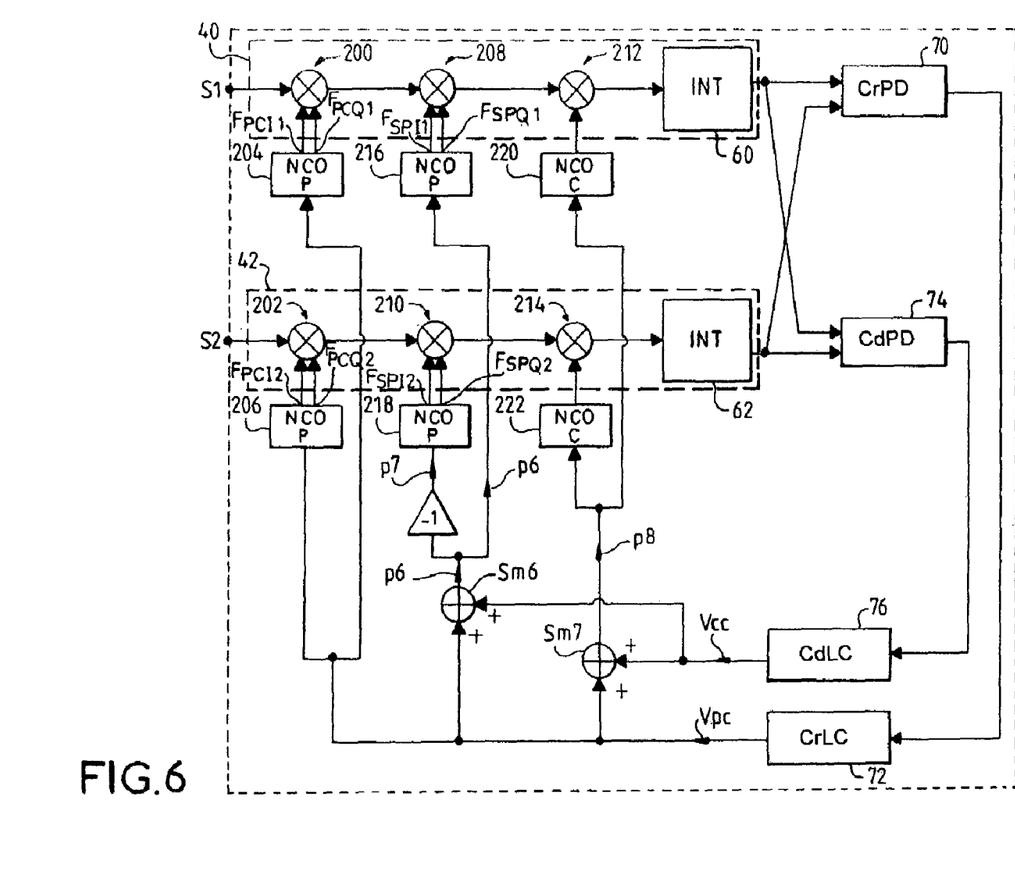
FIG. 6 shows a variant of the receiver of FIG. 5 according to the invention.

FIG. 6 shows a variant of the receiver of FIG. 5 according to the invention, which includes three numerically controlled oscillators per channel for the signals S1 and S2. In this embodiment, the code correlation channels and the subcarrier correlation channels are assisted by the carrier speed Vcc.

The receiver of FIG. 6 includes the first correlator circuit 40 into which a first received signal S1 at the frequency $F_{E1}$ is delivered and the second correlator circuit 42 into which the second received signal S2 at the frequency $F_{E2}$ is delivered.

Each correlator circuit comprises a correlation channel 200, 202, for in-phase and quadrature correlation between its respective received signal S1, S2 and two respective local carriers at the central frequency, $F_{PCI1}$, $F_{PCQ1}$ in the case of the first correlation channel 200 and $F_{PCI2}$, $F_{PCQ2}$ in the case of the second channel 202, these quadrature local carriers being generated by a respective central-carrier numerically controlled oscillator 204, 206 controlled by a central-carrier speed signal Vpc output by the carrier loop corrector 72.

The outputs of the central-carrier correlation channels are delivered to the subcarrier correlation channels 208, 210 and then to the code correlation channels 212, 214. The subcarrier correlation channels 208, 210 carry out the complex correlation between the outputs of the central-carrier correlation channels and respective in-phase and quadrature local carriers $F_{SPI1}$, $F_{SPQ1}$ in the case of the first correlation channel and $F_{SPI2}$, $F_{SPQ2}$ in the case of the second correlation channel. The respective local subcarriers $F_{SPI1}$, $F_{SPQ1}$ for subcarrier correlation and $F_{SPI2}$, $F_{SPQ2}$ are generated, the first ones by a first subcarrier numerically controlled oscillator 216 controlled by a signal p6 output by a summer Sm6, the signal p6 resulting from the sum of the carrier speed signal Vpc plus the code speed signal Vcc and the second ones by a second subcarrier numerically controlled oscillator 218 controlled by a signal p7 resulting from the signal p6, output by the summer Sm6, multiplied by −1.

The signals output by the subcarrier correlation channels are then correlated in the respective code correlation channels 212, 214 with the local code delivered by a respective local-code number generator 220, 222 controlled by a signal p8 output by a summer Sm7, the signal p8 resulting from the sum of the carrier speed signal Vpc plus the code speed signal Vcc.

As in the receiver shown in FIG. 3, the code correlations are then integrated by the respective code integrator 60, 62 in order to deliver signals $I_{P1}$, $Q_{P1}$ as output from the first correlator 40 and $I_{P2}$, $Q_{P2}$ as output from the second correlator 42.

In the variants shown in FIGS. 5 and 6, it may be advantageous to use a single local subcarrier generator for the two correlation circuits on S1 and S2, these local carriers being identical.

In the variants shown in FIGS. 5 and 6, it may also be advantageous to use a single local subcarrier generator for the two correlation circuits on S1 and S2, these local carriers being the conjugates of each other (in the sense of complex numbers).

Figure 7:
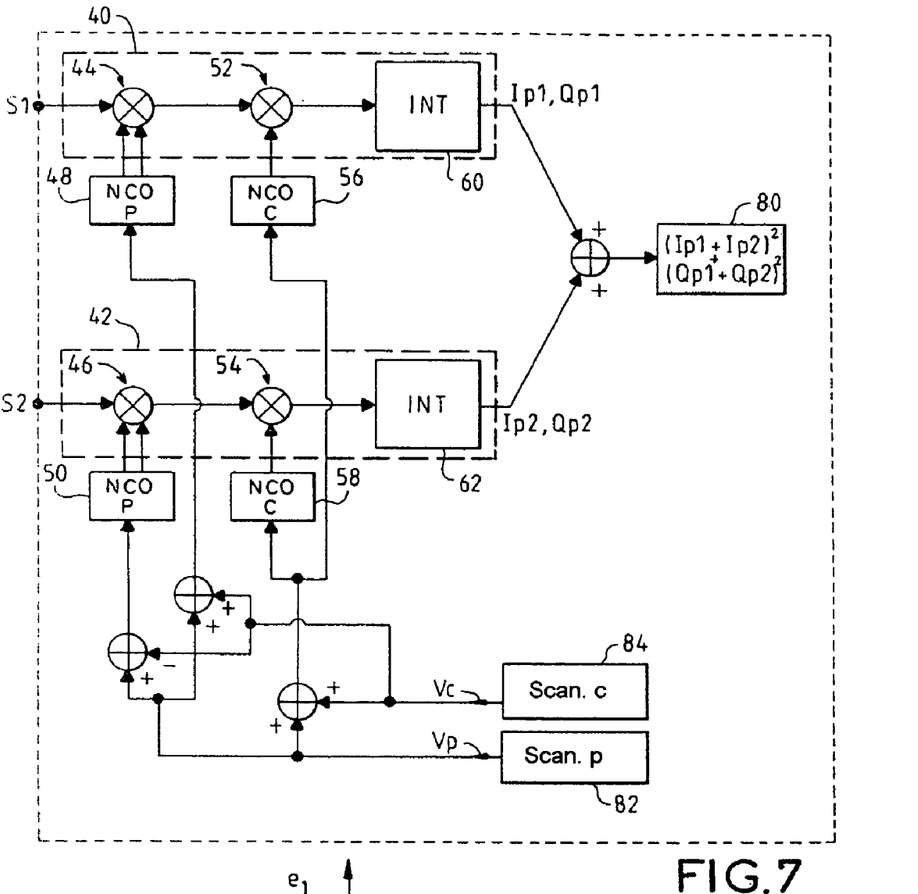
FIG. 7 shows a block diagram of the receiver according to the invention in a first initialization case.
Figure 9:
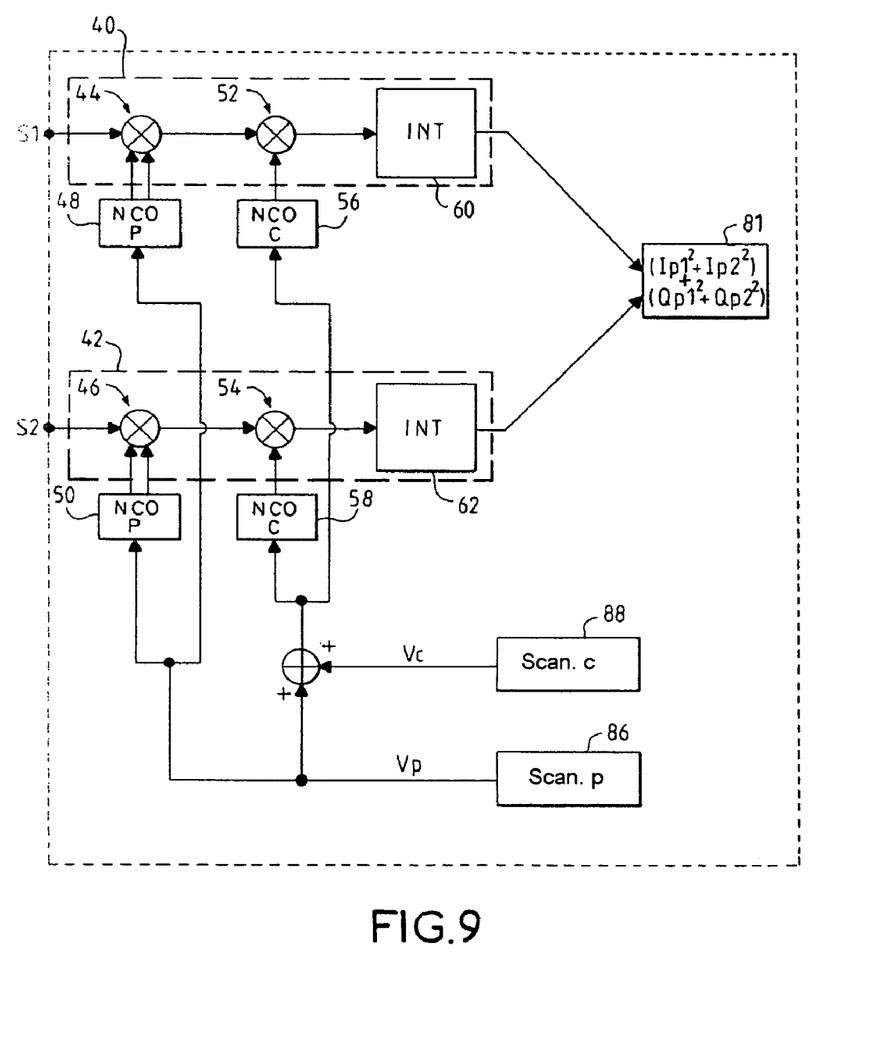
FIG. 9 shows a block diagram of the receiver according to the invention in a second initialization case.

We will now describe below the initialization of the loop of the receiver according to the invention:

First case: the received signals S1 and S2 are synchronous in terms of code and carrier. This is the case in which the two signals are separate, after low-frequency conversion and sampling of a broadband signal containing these two signals, by digital filtering. FIGS. 7 and 9 shown block diagrams of the receiver during its initialization.

An energy search is carried out synchronously between the two signals according to two possibilities. The energy search is carried out on the basis of the signals $I_{P1}$, $Q_{P1}$ and $I_{P2}$, $Q_{P2}$ output by the integrators 60, 62 according to the two possibilities:

First possibility (see FIG. 7):

Energy=$(I_{P1}+I_{P2})^2+(Q_{P1}+Q_{P2})^2$ (block 80 in FIG. 7).

The Doppler assumptions are scanned over the central carrier (block 82) and at the same time the time assumptions (block 84) are scanned over the codes and over the phase differences between the carriers, in accordance with the principle of the invention.

Figure 8:
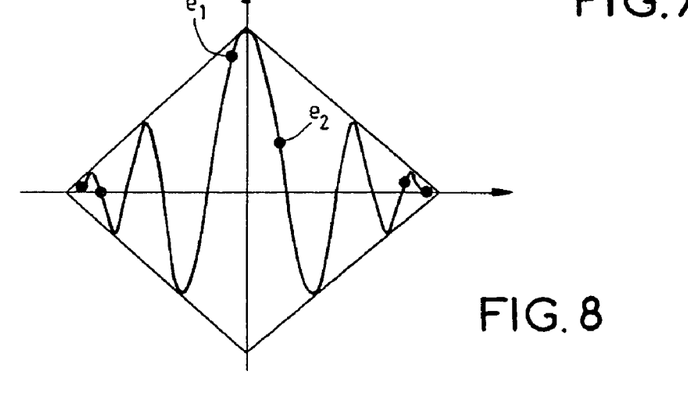
FIG. 8 shows an energy search on the autocorrelation function during initialization of the receiver according to the invention.

In this case, the resulting autocorrelation function, shown in FIG. 8, exhibits ambiguities because of the multiplicity of peaks, that it is necessary to resolve by choosing the maximum power peaks.

There is a risk, during the search, of falling on a zero of the autocorrelation function and of not finding energy, the scanning having to take place under two time assumptions in parallel, separated by the half-width e1, e2 of a peak, over the autocorrelation function (FIG. 8) so as to never have two zeros simultaneously.

Once the energy has been found under the Doppler and time assumptions, the search is refined in order to determine the main peak and then the carrier and time loops are closed by applying the discriminators 70, 74 and the loop correctors 72, 76, such as those shown in FIG. 3 of the receiver according to the invention.

Second possibility (see FIG. 9):

Energy=$(I_{P1}^2+Q_{P1}^2)+(I_{P2}^2+Q_{P2}^2)$ (block 81 in FIG. 9).

The same Doppler assumptions are scanned over each carrier (block 86) and the same time assumptions (block 88) are scanned over the two codes, eliminating the phase of the carrier of each channel by taking the quadratic sum of the two channels, so as not to be disturbed by the phase differences between carriers. In this case, the resulting autocorrelation function is no longer ambiguous and no longer requires a parallel scan.

Once the energy has been found under the Doppler and time assumptions, the search is refined in order to have a precise estimate of the positions of the codes and of the Doppler, and then the carrier and time loops are closed by applying the discriminators 70, 74 and the loop correctors 72, 76 and by changing the manner of applying the speed commands output by the carrier and code loop correctors, in accordance with the principle of the invention.

Second case: the signals received are desynchronized a) case in which the two signals are separated before the sampling, by analog filtering:

The depairing of the analog components may induce a phase shift between the two signals and an amplitude difference. In this case, the initialization is performed by:

independently carrying out the acquisition of the signals, and then making the carrier and code loops converge;

identifying the amplitudes of the signals in the discrete channels;

applying the code and carrier discriminators of the invention, after having normalized the complex samples $Z_{P1}$ and $Z_{P2}$ by their respective amplitudes; and changing the manner of applying the speed commands output by the carrier and code loop correctors in accordance with the principle of the invention.

In a variant of the satellite positioning receiver according to the invention; an extended discriminator is used for the carrier loop (of the DBPSK type) applied to the sum of the cumulative samples from the two channels for applications with high dynamics.

The receiver according to the invention finds its use in any positioning application based on the technique of transmitting a spectrum signal spread by a spreading code, performed on the basis of two signals transmitted by the same source synchronously on two different but close frequencies. For example, in the case of Galileo, the use of signals available in the E1 and E frequency bands.

The invention claimed is:

1. A satellite position pinpointing receiver intended to carry out combined processing of a first received radio signal and a second received radio signal (S2) that differ in frequency, comprising:

a first correlator circuit and a second correlator circuit receiving the first and second received signals respectively, each correlator having a correlation channel for in-phase and quadrature correlation between the respective received signal and a respective local carrier, a code correlation channel for correlation between the I- and Q-correlated received signal and a respective local code, and a code correlation channel integrator;

a central-carrier phase discriminator for discriminating between the two carriers of the received signals, the phase discriminator delivering, on the basis of the signals Ip1, Qp1 and Ip2, Qp2 output by the two integrators and after phase loop correction, a central-carrier speed signal (Vpc);

a device that delivers, on the basis of the central-carrier speed and of a subcarrier speed, the respective local carriers for the carrier correlation channels, this subcarrier being the image of the differences between each received-signal carrier and the central carrier;

a code phase discriminator that delivers, on the basis of the signals Ip1, Qp1 and Ip2, Qp2 output by the integrators and after a code loop correction, the subcarrier speed signal for the carrier correlation and code correlation channels; and a numerically controlled oscillator for each code correlation channel, the oscillator delivering, on the basis of the subcarrier speed or code speed, the respective local code for each code channel.

2. The pinpointing receiver as claimed in claim 1, wherein the code correlation function resulting from the processing, according to the invention, of the received signals is the envelope of the code correlation function alone multiplied by a sinusoidal frequency function equal to the frequency difference between the centers of the bands of the received signals.

3. The pinpointing receiver as claimed claim 1, wherein it includes a single carrier loop and a single code loop for processing the two received signals, the carrier loop slaving the phase of the central carrier for the local signals to the phase of the central carrier for the received signals and the code loop or subcarrier loop slaving the phase of the local subcarrier, which is the image of the phase difference between the carriers for the two local signals, to the phase of the received subcarrier, which is the image of the phase difference between the two received signals, and the position of the local codes to the received codes.

4. The pinpointing receiver as claimed in claim 1, wherein in order to generate the local carriers of the carrier correlation channel, in the case of the first correlation channel and in the case of the second correlation channel, it is necessary to take account of the central carrier between the signals and of the subcarrier, this subcarrier being the image of the differences between each received-signal carrier and the central carrier, the carrier numerically controlled oscillators delivering, on the basis of the carrier speed signal and of the code speeds (Vcc), output respectively by the central-carrier loop corrector and the code loop corrector, the two respective local carriers in the case of the first correlation channel and in the case of the second correlation channel.

5. The pinpointing receiver as claimed in claim 4, wherein on the one hand, the numerically controlled oscillator of the carrier correlation channel of the first correlator circuit is controlled by a signal p1 output by a summer Sm1, the summer Sm1 taking the sum of the carrier speed signal Vpc plus the code speed signal Vcc.G1, where G1 is a gain given by the ratio of the subcarrier frequency $F_{SP}$ to the carrier frequency $F_{P1}$ of the first signal ($G1=F_{SP}/F_{P1}$) and, on the other hand, the numerically controlled oscillator of the carrier correlation channel of the second correlator circuit is controlled by a signal p2 output by a summer Sm2, the summer Sm2 taking the sum of the carrier speed signal Vpc plus the code speed signal Vcc.($-G2$), where G2 is a gain given by the ratio of the subcarrier frequency $F_{SP}$ to the carrier frequency $F_{P2}$ of the second signal ($G2=F_{SP}/F_{P2}$), the subcarrier frequency $F_{SP}$ being:

$F_{SP}=(F_{P1}-F_{P2})/2$ and the central carrier frequency $F_{pc}$ being:

$$F_{pc}=(F_{P1}+F_{P2})/2$$

where $F_{P1}$ is the frequency of the carrier 1 and $F_{P2}$ is the frequency of carrier 2.

6. The pinpointing receiver as claimed in claim 5, wherein the code numerically controlled oscillators deliver, on the basis of the subcarrier speed signal Vcc output by the code loop corrector, the respective local code for each code correlation channel.

7. The pinpointing receiver as claimed in claim 5 wherein the code loop is aided by the carrier loop, the numerically controlled oscillators of the code correlation channels being controlled by a signal p3 output by a summer Sm3 resulting from the sum of the carrier speed signal (Vpc) plus the code speed signal (Vcc).

8. The pinpointing receiver as claimed in claim 1, wherein the carrier phase discriminator delivers a phase error $\delta\phi$ such that:

$$\delta\varphi = \arctan\left(\frac{\text{Im}(Z_{P1}+Z_{P2})}{\text{Re}(Z_{P1}+Z_{P2})}\right) = \arctan\left(\frac{Q_{P1}+Q_{P2}}{I_{P1}+I_{P2}}\right)$$

$Z_{P1}$ and $Z_{P2}$ being the complex samples of the signal, and in that the code phase discriminator delivers a phase error $\delta\epsilon$ such that:

$$\delta\varepsilon = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1}-I_{P1}Q_{P2}}{I_{P1}I_{P2}+Q_{P1}Q_{P2}}\right).$$

9. The pinpointing receiver as claimed in claim 1, wherein with data, the integration of the samples ($I_P$, $Q_p$) is carried out over the duration of the data bits, the carrier phase discriminator delivering a phase error:

$$\delta\varphi = \arctan\left(\frac{\text{Im}(\varepsilon_1 Z_{P1}+\varepsilon_2 Z_{P2})}{\text{Re}(\varepsilon_1 Z_{P1}+\varepsilon_2 Z_{P2})}\right) = \arctan\left(\frac{\varepsilon_1 Q_{P1}+\varepsilon_2 Q_{P2}}{\varepsilon_1 I_{P1}+\varepsilon_2 I_{P2}}\right)$$

where $\epsilon_1=\text{sign}(I_{P1})$ $\epsilon_2=\text{sign}(I_{P2})$ and in that the code phase discriminator delivers a code phase error:

$$\delta\varphi = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1}-I_{P1}Q_{P2}}{I_{P1}I_{P2}+Q_{P1}Q_{P2}}\right).$$

10. The pinpointing receiver as claimed in claim 1, wherein the carrier numerically controlled oscillators deliver, on the basis of the carrier speed signal Vpc and of the code speeds Vcc, output respectively by the central-carrier loop corrector and the code loop corrector, the two respective local carriers in the case of the first correlation channel and in the case of the second correlation channel and in that, on the one hand, the numerically controlled oscillator of the carrier correlation channel of the first correlator circuit is controlled by a signal p4 output by a summer Sm4, the summer Sm4 taking the sum of the carrier speed signal plus the code speed signal and, on the other hand, the numerically controlled oscillator of the carrier correlation channel of the second correlator circuit is controlled by a signal p5 output by a summer Sm5, the summer Sm5 taking the sum of the carrier speed signal plus the code speed signal, the subcarrier frequency $F_{SP}$ being:

$$F_{SP}=(F_{P1}-F_{P2})$$

and the central carrier frequency $F_{pc}$ being:

$$F_{pc}=(F_{P1}+F_{P2})/2$$

where $F_{P1}$ is the frequency of carrier 1 and $F_{P2}$ is the frequency of carrier 2.

11. The pinpointing receiver as claimed in claim 10, wherein the code numerically controlled oscillators deliver, on the basis of the subcarrier speed signal Vcc output by the code loop corrector, the respective local code for each code channel and the local despreading codes.

12. The pinpointing receiver as claimed in claim 1 wherein the device comprises three numerically controlled oscillators per channel for the signals S1 and S2.

13. The pinpointing receiver as claimed in claim 12, wherein each correlator circuit comprises a correlation channel for in-phase and quadrature correlation between its respective received signal and two respective local carriers at the central frequency, in the case of the first correlation channel and in the case of the second correlation channel, these local quadrature carriers being generated by a respective central-carrier numerically controlled oscillator controlled by a central-carrier speed signal output by the carrier loop corrector and in that the outputs of these central-carrier correlation channels are delivered to subcarrier correlation channels and then to the code correlation channels, in that the subcarrier correlation channels carry out the complex correlation between the outputs of these central-carrier correlation channels and respective local in-phase and quadrature subcarriers and.

14. The pinpointing receiver as claimed in claim 13, wherein the respective local in-phase and quadrature subcarriers and are generated, the first ones by a first subcarrier numerically controlled oscillator controlled by the code speed signal Vcc output by the code loop corrector and the second ones by a second subcarrier numerically controlled oscillator controlled by the code speed signal Vcc multiplied by −1, output by the code loop corrector.

15. The pinpointing receiver as claimed in claim 14, wherein the signals output by the subcarrier correlation channels are then correlated in the respective code correlation channels with the local code delivered by a respective local-code number generator controlled by the code speed signal Vcc.

16. The pinpointing receiver as claimed in claim 13, wherein the respective local subcarriers for subcarrier correlation are generated, the first ones by a first subcarrier numerically controlled oscillator controlled by a signal p6 output by a summer Sm6, the signal p6 resulting from the sum of the carrier speed signal Vpc plus the code speed signal Vcc and the second ones by a second subcarrier numerically controlled oscillator controlled by a signal p7 resulting from the signal p6, output by the summer Sm6, multiplied by −1 and in that the signals output by the subcarrier correlation channels are then correlated in the respective code correlation channels with the local code delivered by a respective local-code number generator controlled by a signal p8 output by a summer Sm7, the signal p8 resulting from the sum of the carrier speed signal Vpc plus the code speed signal Vcc.

17. The pinpointing receiver as claimed in claim 1, wherein, when the received signals are synchronous codewise and carrierwise, the energy search is carried out synchronously between the two signals, the energy search taking place on the basis of the signals $I_{P1}$, $Q_{P1}$, and $I_{P2}$, $Q_{P2}$ output by the integrators by calculating:

$$\text{energy}=(I_{P1}+I_{P2})^2+(Q_{P1}+Q_{P2})^2$$

and in that the Doppler assumptions are scanned over the central carrier and the time assumptions are scanned both over the codes and over the phase differences between the carriers, in accordance with the principle of the invention, and in that the maximum power peaks of the autocorrelation function are chosen.

18. The pinpointing receiver as claimed in claim 17, wherein the scanning takes place with two time assumptions in parallel, separated by the half-width of a peak, over the autocorrelation function so as to never have two zeros simultaneously and in that, once the energy has been found under the Doppler and time assumptions, the search is refined in order to determine the main peak and then the carrier and time loops are closed by applying the discriminators and the loop correctors of the receiver according to the invention.

19. The pinpointing receiver as claimed in claim 1, wherein, when the received signals are synchronous code-wise and carrierwise, the energy search is carried out synchronously between the two signals, the energy search taking place on the basis of the signals $I_1$, $Q_{P1}$, and $I_{P2}$, $Q_{P2}$ output by the integrators by calculating:

$$\text{energy}=(I_{P1}^2+Q_{P1}^2)+(I_{P2}^2+Q_{P2}^2)$$

and in that the same Doppler (and phase) assumptions are scanned over each carrier and the same time assumptions are scanned over the two codes, eliminating the phase of the carrier of each channel by taking the quadratic sum of the two channels, the resulting autocorrelation function no longer being ambiguous and no longer requiring a parallel scan.

20. The pinpointing receiver as claimed in claim 19, wherein, once the energy has been found under the Doppler and time assumptions, the search is refined in order to have a precise estimate of the positions of the codes and of the Doppler, and then the carrier and time loops are closed by applying the discriminators and the loop correctors and by changing the manner of applying the speed commands output by the carrier loop corrector and the code loop corrector, in accordance with the principle of the invention.

21. The pinpointing receiver as claimed in claim 1, wherein, when the received signals are desynchronized, the receiver is initialized:
by independently carrying out the acquisition of the signals and then making the carrier and code loops converge;
by identifying the amplitudes of the signals in the discrete channels;
by applying the code and carrier discriminators of the invention, after having normalized the complex samples $Z_{P1}$ and $Z_{P2}$ by their respective amplitudes; and
by changing the manner of applying the speed commands output by the carrier loop corrector and the code loop corrector, in accordance with the principle of the invention.

22. The pinpointing receiver as claimed in claim 2, wherein it includes a single carrier loop and a single code loop for processing the two received signals, the carrier loop slaving the phase of the central carrier for the local signals to the phase of the central carrier for the received signals and the code loop or subcarrier loop slaving the phase of the local subcarrier, which is the image of the phase difference between the carriers for the two local signals, to the phase of the received subcarrier, which is the image of the phase difference between the two received signals, and the position of the local codes to the received codes.

23. The pinpointing receiver as claimed in claim 2, wherein in order to generate the local carriers of the carrier correlation channel, in the case of the first correlation channel and in the case of the second correlation channel, it is necessary to take account of the central carrier between the signals and of the subcarrier, this subcarrier being the image of the differences between each received-signal carrier and the central carrier, the carrier numerically controlled oscillators (NCO p) delivering, on the basis of the carrier speed signal and of the code speeds (Vcc), output respectively by the central-carrier loop corrector and the code loop corrector, the two respective local carriers in the case of the first correlation channel and in the case of the second correlation channel.

24. The pinpointing receiver as claimed in claim 3, wherein in order to generate the local carriers of the carrier correlation channel, in the case of the first correlation channel and in the case of the second correlation channel, it is necessary to take account of the central carrier between the signals and of the subcarrier, this subcarrier being the image of the differences between each received-signal carrier and the central carrier, the carrier numerically controlled oscillators (NCO p) delivering, on the basis of the carrier speed signal and of the code speeds (Vcc), output respectively by the central-carrier loop corrector and the code loop corrector, the two respective local carriers in the case of the first correlation channel and in the case of the second correlation channel.

25. The pinpointing receiver as claimed in either of claim 6, wherein the code loop is aided by the carrier loop, the numerically controlled oscillators of the code correlation channels being controlled by a signal p3 output by a summer Sm3 resulting from the sum of the carrier speed signal (Vpc) plus the code speed signal (Vcc).

26. The pinpointing receiver as claimed in claim 2, wherein with data, the integration of the samples ($I_P$, $Q_P$) is carried out over the duration of the data bits, the carrier phase discriminator delivering a phase error:

$$\delta\varphi = \arctan\left(\frac{\text{Im}(\varepsilon_1 Z_{P1} + \varepsilon_2 Z_{P2})}{\text{Re}(\varepsilon_1 Z_{P1} + \varepsilon_2 Z_{P2})}\right) = \arctan\left(\frac{\varepsilon_1 Q_{P1} + \varepsilon_2 Q_{P2}}{\varepsilon_1 I_{P1} + \varepsilon_2 I_{P2}}\right)$$

where $\varepsilon_1 = \text{sign}(I_{P1})$ $\varepsilon_2 = \text{sign}(I_{P2})$
and in that the code phase discriminator delivers a code phase error:

$$\delta\varphi = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1} - I_{P1}Q_{P2}}{I_{P1}I_{P2} + Q_{P1}Q_{P2}}\right).$$

27. The pinpointing receiver as claimed in claim 3, wherein with data, the integration of the samples ($I_P$, $Q_P$) is carried out over the duration of the data bits, the carrier phase discriminator delivering a phase error:

$$\delta\varphi = \arctan\left(\frac{\text{Im}(\varepsilon_1 Z_{P1} + \varepsilon_2 Z_{P2})}{\text{Re}(\varepsilon_1 Z_{P1} + \varepsilon_2 Z_{P2})}\right) = \arctan\left(\frac{\varepsilon_1 Q_{P1} + \varepsilon_2 Q_{P2}}{\varepsilon_1 I_{P1} + \varepsilon_2 I_{P2}}\right)$$

where $\varepsilon_1 = \text{sign}(I_{P1})$ $\varepsilon_2 = \text{sign}(I_{P2})$
and in that the code phase discriminator delivers a code phase error:

$$\delta\varphi = \arctan\left(\frac{\text{Im}(Z_{P1}/\overline{Z}_{P2})}{\text{Re}(Z_{P1}/\overline{Z}_{P2})}\right) = \arctan\left(\frac{I_{P2}Q_{P1} - I_{P1}Q_{P2}}{I_{P1}I_{P2} + Q_{P1}Q_{P2}}\right).$$

28. The pinpointing receiver as claimed in claim 2, wherein the carrier numerically controlled oscillators deliver, on the basis of the carrier speed signal Vpc and of the code speeds Vcc, output respectively by the central-carrier loop corrector and the code loop corrector, the two respective local carriers in the case of the first correlation channel and in the case of the second correlation channel and in that, on the one hand, the numerically controlled oscillator of the carrier correlation channel of the first correlator circuit is controlled by a signal p4 output by a summer Sm4, the summer Sm4 taking the sum of the carrier speed signal plus the code speed signal and, on the other hand, the numerically controlled oscillator of the carrier correlation channel of the second correlator circuit is controlled by a signal p5 output by a summer Sm5, the summer Sm5 taking the sum of the carrier speed signal plus the code speed signal, the subcarrier frequency $F_{SP}$ being:

$$F_{SP} = (F_{P1} - F_{P2})$$

and the central carrier frequency $F_{pc}$ being:

$$F_{pc} = (F_{P1} + F_{P2})/2$$

where $F_{P1}$ is the frequency of carrier 1 and $F_{P2}$ is the frequency of carrier 2.

29. The pinpointing receiver as claimed in claim 3, wherein the carrier numerically controlled oscillators deliver, on the basis of the carrier speed signal Vpc and of the code speeds Vcc, output respectively by the central-carrier loop corrector and the code loop corrector, the two respective local carriers in the case of the first correlation channel and in the case of the second correlation channel and in that, on the one hand, the numerically controlled oscillator of the carrier correlation channel of the first correlator circuit is controlled by a signal p4 output by a summer Sm4, the summer Sm4 taking the sum of the carrier speed signal plus the code speed signal and, on the other hand, the numerically controlled oscillator of the carrier correlation channel of the second correlator circuit is controlled by a signal p5 output by a summer Sm5, the summer Sm5 taking the sum of the carrier speed signal plus the code speed signal, the subcarrier frequency $F_{SP}$ being:

$$F_{SP} = (F_{P1} - F_{P2})$$

and the central carrier frequency $F_{pc}$ being:

$$F_{pc} = (F_{P1} + F_{P2})/2$$

where $F_{P1}$ is the frequency of carrier 1 and $F_2$ is the frequency of carrier 2.

30. The pinpointing receiver as claimed in claim 2, wherein the device comprises three numerically controlled oscillators per channel for the signals S1 and S2.

31. The pinpointing receiver as claimed in claim 3, wherein when the received signals are synchronous code-wise and carrierwise, the energy search is carried out synchronously between the two signals, the energy search taking place on the basis of the signals $I_{P1}$, $Q_{P1}$, and $I_{P2}$, $Q_{P2}$ output by the integrators by calculating:

$$\text{energy} = (I_{P1} + I_{P2})^2 + (I_{P1} + I_{P2})^2$$

and in that the Doppler assumptions are scanned over the central carrier and the time assumptions are scanned both over the codes and over the phase differences between the carriers, in accordance with the principle of the invention, and in that the maximum power peaks of the autocorrelation function are chosen.

32. The pinpointing receiver as claimed in claim 2, wherein when the received signals are desynchronized, the receiver is initialized:

by independently carrying out the acquisition of the signals and then making the carrier and code loops converge;

by identifying the amplitudes of the signals in the discrete channels;

by applying the code and carrier discriminators of the invention, after having normalized the complex samples $Z_{P1}$ and $Z_{P2}$ by their respective amplitudes; and by changing the manner of applying the speed commands output by the carrier loop corrector and the code loop corrector, in accordance with the principle of the invention.

* * * * *